May 8, 1962 J. H. HOFFMAN 3,034,066

DEMODULATOR

Filed March 9, 1960 3 Sheets-Sheet 1

INVENTOR.
JESS H. HOFFMAN
BY
George C. Sullivan
Agent

INVENTOR.
JESS H. HOFFMAN
BY
George C. Sullivan
Agent

May 8, 1962 J. H. HOFFMAN 3,034,066

DEMODULATOR

Filed March 9, 1960 3 Sheets-Sheet 3

INVENTOR.
JESS H. HOFFMAN
BY
George C. Sullivan
Agent

United States Patent Office 3,034,066
Patented May 8, 1962

3,034,066
DEMODULATOR
Jess H. Hoffman, North Hollywood, Calif., assignor to Lockheed Aircraft Corporation, Burbank, Calif.
Filed Mar. 9, 1960, Ser. No. 13,838
2 Claims. (Cl. 329—50)

This invention pertains to a demodulator circuit. More particularly, this invention relates to clamping circuits wherein the magnitude of a carrier is clamped at its peak so that the modulation signal may be stripped from its carrier.

Circuits which have in the past performed a similar function did so by coupling an externally generated actuating pulse input directly through the grids of vacuum tubes of an electronic bi-directional switch. Such direct coupling required that the pulse attain a value beyond that of the greatest voltage to be clamped. Likewise, the switch actuating pulse had to fall to a level sufficiently low to cut off the switch until the time of the next pulse. Especially when it was desired to clamp to different voltage levels did the proper operation of such an electronic switch become unsatisfactory. When the switch actuating pulse was maintained at sufficient amplitude to exceed the maximum level of the clamping voltage, it became excessive for other levels and due to the direct coupling, the pulse appeared across the clamping capacitor to prevent the attainment of the proper operating conditions.

Some effort was made to use a transformer isolation of the control pulse voltage level from that of the reference and the clamp voltage level so that very little demand was made upon the control pulse circuits. There was still required an external circuit pulse which was applied to the isolation transformer. Normally, other transformers were required which increased size, weight and frequently the number of packages required.

It is an object of the present invention, therefore, to provide a demodulator which generates its own internal actuating pulses. The actuating pulse which samples the incoming carrier signal amplitude is internally generated requiring only a reference signal with a frequency equal to that of the carrier signal.

It is another important object of the present invention to provide a demodulator involving a simple combination of components which may be constructed into a compact package. By generating actuating pulses between the usual isolation transformers and the switching vacuum tubes, a simple compact package is made possible.

Other objects and advantages of the invention will become apparent from the consideration of the following specification when taken in conjunction with the accompanying drawings in which.

Figure 1:
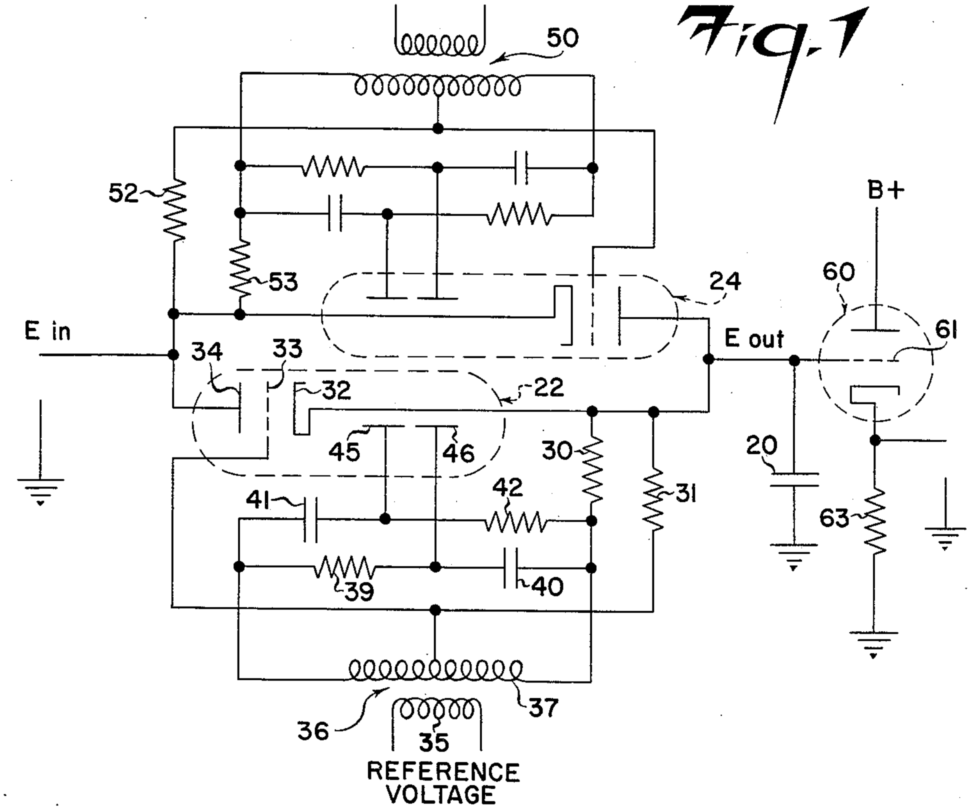
FIG. 1 is a schematic diagram of the high response demodulator showing the circuitry by which an internal pulse is generated.

FIG. 1 shows the components of the demodulator including actuating or gate pulse generating circuitry. E=in is a modulated suppressed carrier signal. E=out is the modulation signal with the carrier removed. To obtain high response in any phase sensitive demodulator, it is necessary to use gating techniques where the gate occurs at the peaks of the carrier signal wave form. The condenser 20 is used as a clamping device to clamp the amplitude of the carrier signal when the gate appears upon the grids of the vacuum tubes 22 and 24.

To obtain the phase sensing of the carrier amplitude, it is required that the gating must occur at 360 degree intervals of the input modulated carrier signal. It is contemplated that the carrier signal is a suppressed carrier where the phase of the carrier reverses 180 degrees at the point where the modulation envelope passes through zero. If the gating occurred at 180 degree intervals, the condenser 20 would charge on one gate and then discharge on the following gate. It is obvious that both charging and discharging paths must be provided to allow for reversal of polarity of E=out. The vacuum tubes 22 and 24 provide the two charge and discharge paths for condenser 20. They are reversed in two paths to allow positive and negative charge as well as positive and negative discharge. Identical and simultaneous gates are applied to the grids of each vacuum tube to cause the phase sensitive detection required.

Vacuum tubes 22 and 24 are shown as duplex diode high mu triodes. The diode section of each tube, together with its related isolation transformer, the two RC networks inverted to each other and resistors 30 and 32 generate the required gates for vacuum tube 22. Identical components appear in the opposite half of the circuitry.

To obtain phase sense of the suppressed carrier E=in so as to obtain a correct polarity of E=out, the phase or time sequence of the gates must be derived from a reference voltage whose phase either coincides with E=in or differs by 180 degrees dependent upon the phase of E=in where E=in may reverse phase but reference voltage does not.

Figure 2:
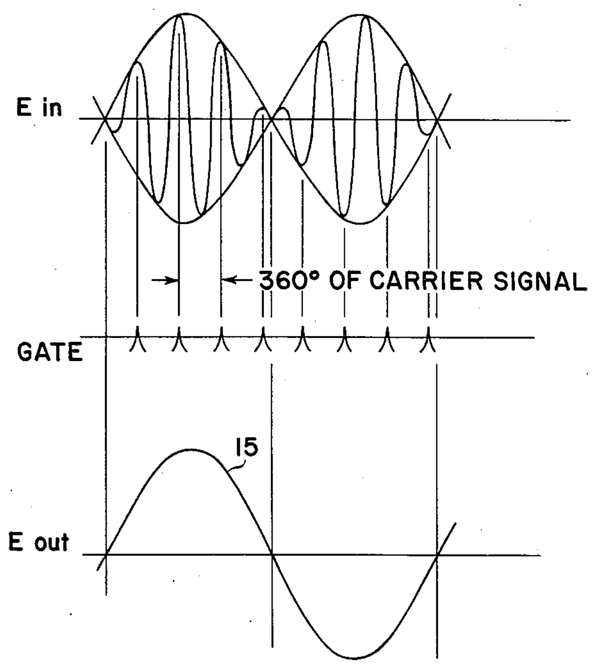
FIG. 2 shows the modulated carrier signal, the relation of the trigger signals to the carrier signal and the modulation signal with the carrier removed.

The required gate for a given phase of the suppressed carrier E=in is shown in FIG. 2. It will be noted that the gates are spaced equally 360 degrees apart and that in one envelope, the amplitude of the input is sensed on its positive peaks and after phase reversal of the E=in, the amplitude is sensed on the negative peaks. Tube 22 will conduct on the positive half peaks of the input carrier when these peaks exceed in magnitude the value of the positive voltage charge previously accumulated on condenser 20, and tube 24 will conduct on the negative half peaks of the input carrier when these peaks exceed in magnitude of the value of the negative voltage charge previously accumulated on condenser 20, although the grids of both tubes 22 and 24 are gated positively by the same gate at the same time period. In either case, if the magnitude of the input voltage peak does not exceed the voltage previously accumulated on condenser 20, the opposite tube will conduct, thus discharging condenser 20. The clamping action of the circuitry is thus so devised as to allow clamping on rising values of peaks of E=in as well as decreasing values.

Figure 4:
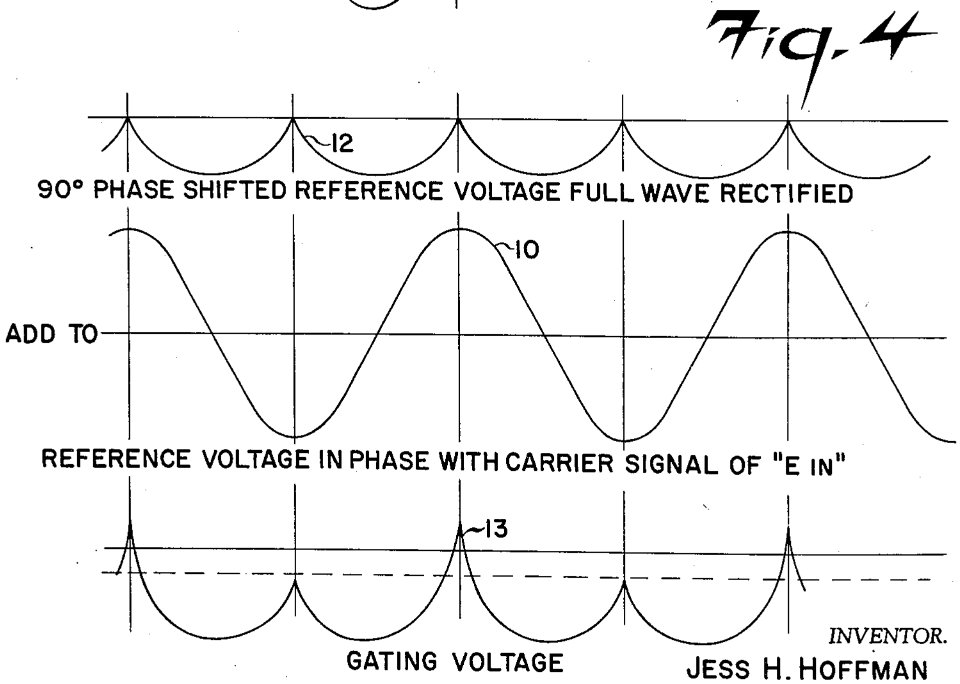
FIG. 4 shows the next step in which a trigger pulse wave form is produced.
Figure 3:
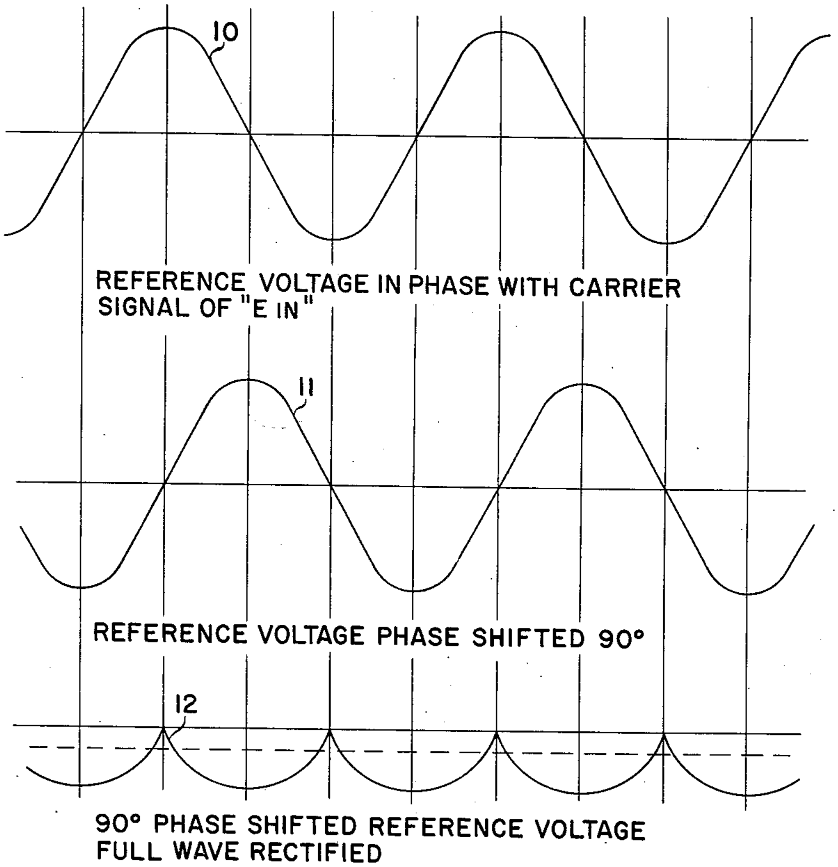
FIG. 3 shows the first and second steps in the generation of a trigger pulse.

If a reference voltage which is in phase or 180 degrees out of phase with the input carrier is phase shifted 90 degrees and is then full wave rectified for a negative voltage output, A gating spikes of voltage will be obtained in phase with the carrier peaks but at 180 degree intervals. If alternate peaks are suppressed, the correct gate will be obtained as shown in FIG. 4. FIG. 3 traces the transformation of the wave form from the original reference voltage which is then shifted 90 degrees and then full wave rectified by the wave form at the bottom of FIG. 3. This full wave rectified signal of the 90 degree shifted reference may now be used as gating voltages if alternate peaks are suppressed. The peaks of the voltage appearing above the cutoff voltage line shown in FIG. 3 can be used as gating voltages to the grids of tube 22 and tube 24. Tubes 22 and 24 are held below cutoff by the negative voltage and can conduct only when the voltage rises above the cutoff line.

The component of the original reference voltage 10 at its original phase as shown in the top section of FIG. 3 is added to the 90 degree phase shifted and full wave rectified reference voltage 12 to arrive at the wave form 13. The full wave rectified reference voltage shifted 90 degrees 12 is shown in the top of FIG. 4 with the original reference voltage 10 applied thereto resulting in suppression of alternate peaks as shown in curve 13 at the bottom of FIG. 4. The voltage peaks above the cutoff line coincident with positive or negative peaks of suppressed carrier E=in are applied to the grids of tubes 22 and 24 as gates.

Figure 5:
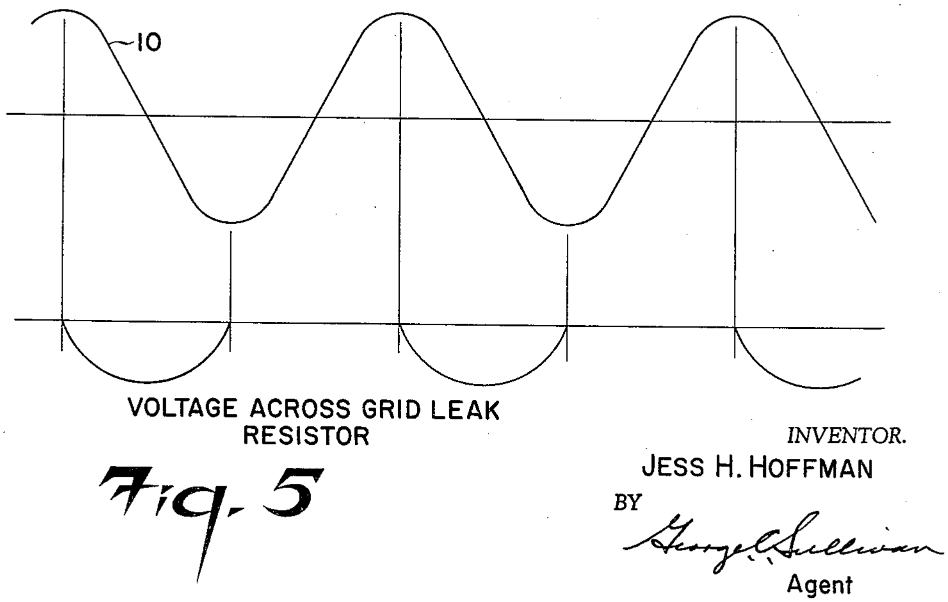
FIG. 5 shows the relationship of the original reference voltage and a halfwave rectified signal from which the actuating pulse is generated.

A more detailed explanation of the gating voltage as derived from the circuitry shown in FIG. 1 is necessary. A reference voltage having a frequency equal to inphase or 180 degrees out of phase with the carrier is applied to the primary 35 of transformer 36. Resistor 39 and condenser 40 form an RC network which will shift the voltage appearing across the secondary 37 by approximately 90 degrees with respect to the original reference voltage. The voltage appearing on diode plate 46 tapped between the resistor 39 and the condenser 40 will be 90 degrees phase shifted as represented by curve 11 in FIG. 3. That signal will then be rectified at diode 46 of the tube 22 to rectify a half wave as shown in the lower part of FIG. 5. It is there compared with the original reference voltage 10 to show the relative time intervals. By providing another RC network comprised of condenser 41 and resistor 42 to produce a 90 degree phase shift in the opposite direction, then rectifying it at diode plate 45, the spaces between the first rectified signal will be filled to achieve the desired wave form 12 as shown in FIGS. 3 and 4. The cutoff voltage of tube 22 is shown in relation to curve 12 in FIG. 3 and curve 13 in FIG. 4 in dashed lines. It is evident that the peaks of the curve 12 occur at 180 degrees which would, if applied to the grids of tubes 22 and 24, cause rapid charge and discharge of condenser 20 without detection of the modulation voltage. It therefore is necessary to suppress every other peak of curve 12 to achieve the desired 360 degree gate.

By adding an inphase component of the reference voltage 10 to the 90 degree phase shifted full wave rectified voltage 12, every other spike will be suppressed. This inphase component is added across resistor 30.

The gating circuitry for tube 24 is the same as that for tube 22. The signal from the isolation transformer 50 will be phase shifted 90 degrees, rectified and a component of the original reference added to it to attain the desired 360 degree gate for the grid of tube 24. The gate on the grid of tube 24 will occur at the same instant as the gate on the grid of tube 22 but because tubes 22 and tubes 24 are reversed, only one will conduct at any one moment.

The signals appearing on the upper plate of condenser 20 will appear also upon the grid 61 of tube 60. Tube 60 in conjunction with resistor 63 is a cathode follower.

A relatively simple and compact demodulator embodying internal trigger pulse generating components has been disclosed. Having revealed the details of my invention, I claim the following combinations and their equivalents to which I wish the protection of a United States Letters Patent.

I claim:

1. A demodulator comprised of a first and a second vacuum tube each having a cathode, a plate, a grid and a pair of diodes, means to apply a modulated carrier signal to the plate of the first tube and the cathode of the second tube, means to generate a trigger pulse for the grid of the first tube including a reference voltage having a phase equal to the carrier signal at least part of the time, means to apply the reference voltage to the primary of a first transformer, means to apply the voltage in the secondary to a first phase shift network to shift the phase of the voltage 90°, means to apply the voltage in the secondary to a second phase shift network to shift the phase of the voltage 90° in the opposite direction, means to apply the phase shifted voltage from the first phase shift network to one of the diodes of the first vacuum tube, means to apply the phase shifted voltage from the second phase shift network to the other of the diodes of the first tube so that there will be a result full wave rectified voltage, means to add the reference voltage to the full wave rectified voltage so as to suppress alternate peaks of the full wave rectified voltage resulting in a voltage having pulses spaced 360° from each other having a frequency equal to that of the carrier signal, means to apply the pulses to the grid of the first vacuum tube, means to generate a trigger pulse for the grid of the second tube including means to apply the reference voltage to the primary of a second transformer, means to apply the voltage in the secondary of the second transformer to a third phase shift network to shift the phase of the voltage 90°, means to apply the voltage in the secondary of the second transformer to a fourth phase shift network to shift the phase of the voltage 90° in the opposite direction, means to apply the phase shifted voltage from the third phase shift network to one of the diodes in the second vacuum tube, means to apply the phase shifted voltage from the fourth phase shift network to other of the diodes of the second tube so that there will be a resultant full wave rectified voltage, means to add the reference voltage to the full wave rectified voltage so as to suppress the alternate peaks of the full wave rectified voltage resulting in a voltage having pulses spaced 360° from each other having a frequency equal to that of the carrier signal, means to apply the pulses to the grid of the second vacuum tube, means to connect the cathode of the first tube and the plate of the second tube to one side of a condenser, means to connect the other side of the condenser to ground.

2. A demodulator comprised of a first and second vacuum tube each having a cathode, a plate, a grid and a pair of diodes, means to apply a modulated carrier signal to the plate of the first tube and cathode of the second tube, means to generate a trigger pulse for the grid of the first tube including a reference voltage having a phase equal to the carrier signal at least part of the time, means to apply the reference voltage to a first phase shift network to shift the phase of the voltage 90°, means to apply the reference voltage to a second phase shift network to shift the phase of the reference voltage 90° in the opposite direction, means to apply the phase shifted voltage from the first phase shift network to one of the diodes in the first vacuum tube, means to apply the phase shifted voltage from the second phase shift network to the other diode in the first tube so that there will be a resultant full wave rectified voltage, means to add the reference voltage to the full wave rectified voltage so as to suppress alternate peaks of the full wave rectified voltage resulting in a voltage having pulses spaced 360° from each other having a frequency equal to that of the carrier signal, means to apply the pulses to the grid of the first vacuum tube, means to generate a trigger pulse for the grid of the second tube including means to apply the reference voltage to a third phase shift network to shift the phase of the voltage 90°, means to apply the reference voltage to a fourth phase shift network to shift the phase of the reference voltage 90° in the opposite direction, means to apply the phase shifted voltage from the third phase shift network to one of the diodes of the second vacuum tube, means to apply the phase shifted voltage from the fourth phase shift network to the other diode of the second tube so that there will be a resultant full wave rectified voltage, means to add the reference voltage to the full wave rectified voltage so as to suppress alternate peaks of the full wave rectified voltage resulting in a voltage having pulses spaced 360° from each other having a frequency equal to that of the carrier signal, means to apply the pulses to the grid of the second vacuum tube, means to connect the cathode of the first tube and the plate of the second tube to one side of a condenser, means to connect the other side of a condenser to ground.

References Cited in the file of this patent

UNITED STATES PATENTS

| | | |
|---|---|---|
| Re. 23,288 | Krumhansl et al. | Oct. 24, 1950 |
| 2,389,692 | Sherwin | Nov. 27, 1945 |
| 2,521,058 | Goldberg | Sept. 5, 1950 |
| 2,708,718 | Weiss | May 17, 1955 |
| 2,884,522 | Graser | Apr. 28, 1959 |
| 2,943,193 | Webb | June 28, 1960 |